United States Patent
Hara

(10) Patent No.: US 12,211,530 B1
(45) Date of Patent: Jan. 28, 2025

(54) MAGNETIC DISK APPARATUS AND METHOD

(71) Applicants: Kabushiki Kaisha Toshiba, Tokyo (JP); Toshiba Electronic Devices & Storage Corporation, Tokyo (JP)

(72) Inventor: Takeyori Hara, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/442,275

(22) Filed: Feb. 15, 2024

(30) Foreign Application Priority Data

Sep. 22, 2023 (JP) ................. 2023-157434

(51) Int. Cl.
*G11B 33/08* (2006.01)
*G11B 5/596* (2006.01)

(52) U.S. Cl.
CPC ...... *G11B 5/59694* (2013.01); *G11B 5/59688* (2013.01)

(58) Field of Classification Search
CPC ... G11B 5/59638; G11B 5/59633; G11B 5/54; G11B 5/5539; G11B 5/56; G11B 5/58; G11B 33/08; G11B 19/02; G11B 25/043; G11B 33/142

USPC ................................. 360/75, 97.19
See application file for complete search history.

(56) References Cited

U.S. PATENT DOCUMENTS

| 7,586,712 | B2 | 9/2009 | Cho et al. |
| 10,210,893 | B2 | 2/2019 | Hironaka |
| 10,437,270 | B2 * | 10/2019 | Kwon ................. G11B 33/142 |
| 2005/0152058 | A1 | 7/2005 | Schmidt |

* cited by examiner

*Primary Examiner* — Nabil Z Hindi
(74) *Attorney, Agent, or Firm* — Maier & Maier, PLLC

(57) ABSTRACT

According to an embodiment, a controller of a magnetic disk apparatus moves a magnetic head to a first track being one of tracks on a magnetic disk. The controller acquires, in a servo sampling cycle, a positioning error amount of the magnetic head with respect to the first track. The controller executes an access to the first track by the magnetic head after a positioning error amount equal to or less than a first threshold is continuously acquired a first set number of times. The controller obtains a frequency estimation value by estimating a frequency of residual vibration of the magnetic head due to movement of the magnetic head to the first track and obtains an amplitude estimation value by estimating an amplitude of the residual vibration. The controller updates the first set number of times on the basis of the frequency estimation value and the amplitude estimation value.

20 Claims, 9 Drawing Sheets

MAGNETIC DISK APPARATUS AND METHOD

CROSS-REFERENCE TO RELATED APPLICATIONS

This application is based upon and claims the benefit of priority from Japanese Patent Application No. 2023-157434, filed on Sep. 22, 2023; the entire contents of which are incorporated herein by reference.

FIELD

Embodiment described herein relate generally to a magnetic disk apparatus and a method.

BACKGROUND

In a magnetic disk apparatus, when a seek operation is performed, a write operation or a read operation with respect to a target track is executed after a residual vibration of a magnetic head is sufficiently attenuated.

DETAILED DESCRIPTION

According to the present embodiment, a magnetic disk apparatus includes a magnetic disk, a magnetic head, and a controller. On the magnetic disk, multiple tracks are provided. The controller moves the magnetic head to a first track that is one of the multiple tracks. The controller acquires, in a servo sampling cycle, a positioning error amount of the magnetic head with respect to the first track. The controller executes an access to the first track by using the magnetic head after a positioning error amount being equal to or less than a first threshold is continuously acquired a first set number of times. The controller obtains a frequency estimation value by estimating a frequency of residual vibration of the magnetic head due to movement of the magnetic head to the first track and obtains an amplitude estimation value by estimating an amplitude of the residual vibration. The controller updates the first set number of times on the basis of the frequency estimation value of the residual vibration and the amplitude estimation value of the residual vibration.

Hereinafter, a magnetic disk apparatus and a method according to embodiments will be described in detail with reference to the accompanying drawings. Note that the present invention is not limited by these embodiments.

First Embodiment

Figure 1:
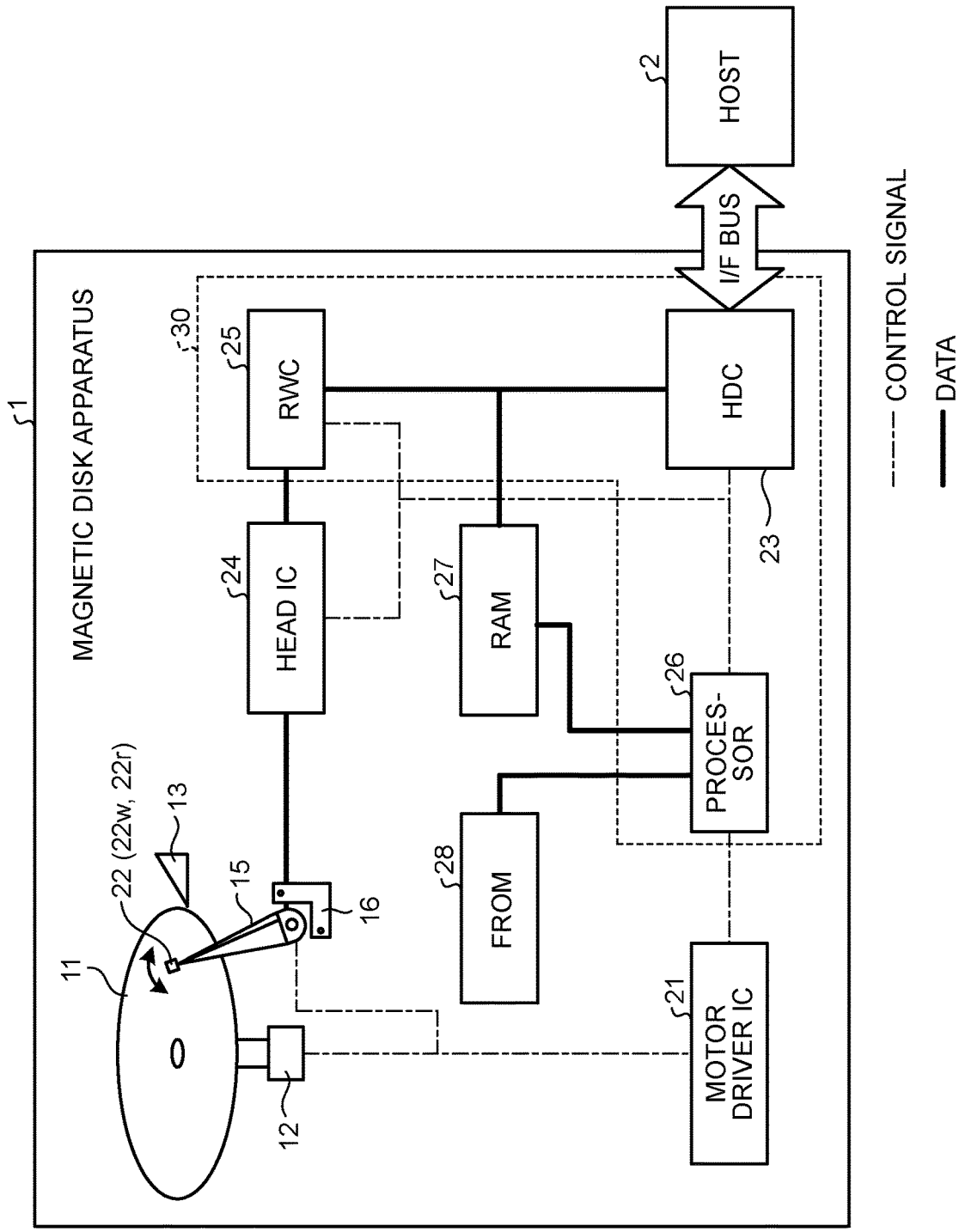
FIG. 1 is a schematic diagram illustrating an example of a configuration of a magnetic disk apparatus according to a first embodiment.

FIG. 1 is a schematic diagram illustrating an example of a configuration of a magnetic disk apparatus 1 according to a first embodiment.

The magnetic disk apparatus 1 can be connected to a host 2. The magnetic disk apparatus 1 can receive an access command from the host 2 when being connected to the host 2. The access command is a write command, a read command, or the like.

The magnetic disk apparatus 1 includes a magnetic disk 11 having a magnetic layer formed on a surface thereof. The magnetic disk apparatus 1 writes data to the magnetic disk 11 or reads data from the magnetic disk 11 in response to the access command.

Data is written and read via a magnetic head 22. In addition to the magnetic disk 11, the magnetic disk apparatus 1 includes a spindle motor 12, a ramp 13, an actuator arm 15, a voice coil motor (VCM) 16, a motor driver integrated circuit (IC) 21, the magnetic head 22, a hard disk controller (HDC) 23, a head IC 24, a read/write channel (RWC) 25, a processor 26, a RAM 27, and a flash read only memory (FROM) 28.

The magnetic disk 11 is rotated at a predetermined rotation speed by the spindle motor 12 that is attached coaxially. The spindle motor 12 is driven by the motor driver IC 21.

The processor 26 controls the rotation of the spindle motor 12 and the rotation of the VCM 16 via the motor driver IC 21.

The magnetic head 22 writes and reads information to and from the magnetic disk 11 by a write element 22w and a read element 22r provided in the magnetic head 22. The magnetic head 22 is attached to a distal end of the actuator arm 15. The magnetic head 22 is moved in a radial direction of the magnetic disk 11 by the VCM 16. Note that some sets of one or both of the write elements 22w and the read elements 22r included in the magnetic head 22 may be provided in a single magnetic head 22.

The magnetic head 22 is moved onto the ramp 13 when, for example, the rotation of the magnetic disk 11 is stopped. The ramp 13 is configured to hold the magnetic head 22 at a position spaced apart from the magnetic disk 11.

In the write operation, the head IC 24 amplifies a signal corresponding to the data to be written supplied from the RWC 25 and supplies the amplified signal to the magnetic head 22. In addition, the head IC 24 amplifies and outputs a signal read from the magnetic disk 11 by the magnetic head 22 during the read operation, and supplies the signal to the RWC 25.

The HDC 23 controls transmission and reception of data with the host 2 via the I/F bus.

The RAM 27 is used as a buffer for data to be written to the magnetic disk 11 and for data read from the magnetic disk 11. In addition, the RAM 27 is provided with a command queue in which the access command received from the host 2 is stored.

The RAM 27 is used as an operation memory by the processor 26. The RAM 27 is used as an area in which firmware is loaded and an area in which various types of management data are temporarily stored.

The RAM 27 includes a volatile memory capable of high-speed operation. The type of the memory constituting the RAM 27 is not limited to a specific type. The RAM 27 can be configured by, for example, a dynamic random access memory (DRAM), a static random access memory (SRAM), or a combination thereof.

The RWC 25 performs data translation such as error correction coding and modulation coding on the data to be written supplied from the HDC 23 in units of sectors, and supplies the data after the data translation to the head IC 24. In addition, the RWC 25 performs processing such as error correction and demodulation in units of sectors on the signal read from the magnetic disk 11 and supplied from the head IC 24, and outputs the processed signal to the HDC 23 as digital data.

In one example, the processor 26 is a central processing unit (CPU). The RAM 27 and the FROM 28 are connected to the processor 26.

The FROM 28 is a nonvolatile memory that stores firmware (program data), various operation parameters, and the like.

The processor 26 performs overall control of the magnetic disk apparatus 1 in accordance with the firmware stored in the FROM 28. For example, the processor 26 loads firmware from the FROM 28 to the RAM 27, and executes control of the motor driver IC 21, the head IC 24, the RWC 25, the HDC 23, and the like in accordance with the loaded firmware.

The firmware program may be stored in the magnetic disk 11. Some of or all the functions of the processor 26 may be implemented by a hardware circuit such as a field-programmable gate array (FPGA) or an application specific integrated circuit (ASIC).

The configuration including the HDC 23, the RWC 25, and the processor 26 can also be regarded as a controller 30 that controls the operation of the magnetic disk apparatus 1. In addition to these elements, the controller 30 may include other components (for example, the RAM 27, the FROM 28, or the like).

Moreover, the firmware program may be stored in the magnetic disk 11. Some of or all the functions of the processor 26 may be implemented by a hardware circuit such as a field-programmable gate array (FPGA) or an application specific integrated circuit (ASIC).

Note that the number of the magnetic disks 11 included in the magnetic disk apparatus 1 is not limited to one. Moreover, the magnetic disk apparatus 1 may include actuator arms 15 and magnetic heads 22 in the number corresponding to the number of magnetic disks 11. In addition, in a case where the magnetic disk apparatus 1 includes two or more magnetic heads 22, those magnetic heads 22 may be integrally moved, or those magnetic heads 22 may constitute multiple groups that are capable of independently moving.

Figure 2:
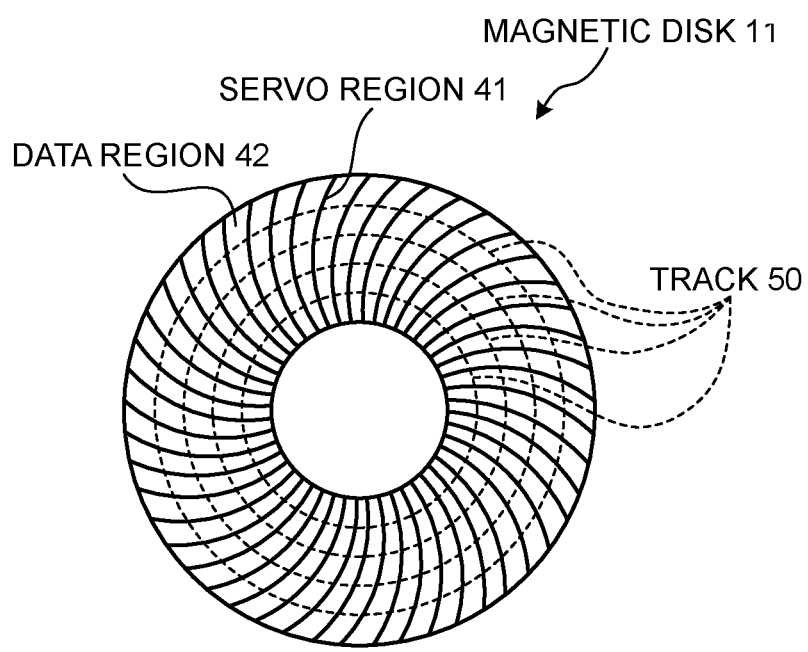
FIG. 2 is a diagram illustrating an example of the configuration of the magnetic disk according to the first embodiment.

FIG. 2 is a diagram illustrating an example of a configuration of the magnetic disk 11 of the first embodiment. Servo data used for positioning the magnetic head 22 is written to the magnetic layer formed on the surface of the magnetic disk 11 by, for example, a servo writer or self-servo write (SSW).

FIG. 2 illustrates the servo regions 41 radially arranged as an example of the arrangement of the servo regions in which the servo data is written. In the circumferential direction, a data region 42 where data can be written is provided between two of the servo regions 41. Concentric tracks 50 are provided in the radial direction of the magnetic disk 11. Multiple sectors in which data of a predetermined size is written are provided in the data region 42 on the track 50. The predetermined size is a sector size.

The servo data is data used for estimating the current position of the magnetic head 22. The controller 30 executes positioning control of the magnetic head 22 on the basis of the servo data read from the servo region 41 by the magnetic head 22.

When accessing (writing or reading) the magnetic disk 11 using the magnetic head 22, the controller 30 first moves the magnetic head 22 in the radial direction toward a target track. The target track is one of the tracks 50 to be accessed. The operation of moving the magnetic head 22 in the radial direction toward the target track is referred to as a seek operation.

When the magnetic head 22 has been moved to the target track by the seek operation, residual vibration of the magnetic head 22 occurs. If the residual vibration is large, the controller 30 cannot correctly perform access.

For example, in the write operation, the controller 30 determines whether the magnetic head 22 is in an on-track state (that is, a state where the magnetic head 22 is considered to be located on the target track). When it is estimated that the magnetic head 22 is not in the on-track state, the controller 30 immediately suspends the write operation. Then, the controller 30 performs retry of the write operation (a retry write operation) after one rotation of the magnetic disk 11. Determination as to whether or not the magnetic head 22 is in the on-track state in the write operation is performed by comparing a positioning error amount with a write off-track slice. When the positioning error amount exceeds the write off-track slice, the controller 30 immediately interrupts the write operation and performs the retry write operation. When the write operation is started in a state where the residual vibration is large, there is a high risk that the positioning error amount exceeds the write off-track slice and the write operation is interrupted.

Therefore, after the seek operation, the controller 30 performs a settling operation of waiting until the residual vibration is sufficiently attenuated. After the settling operation, the controller 30 performs access to the target track.

Figure 3:
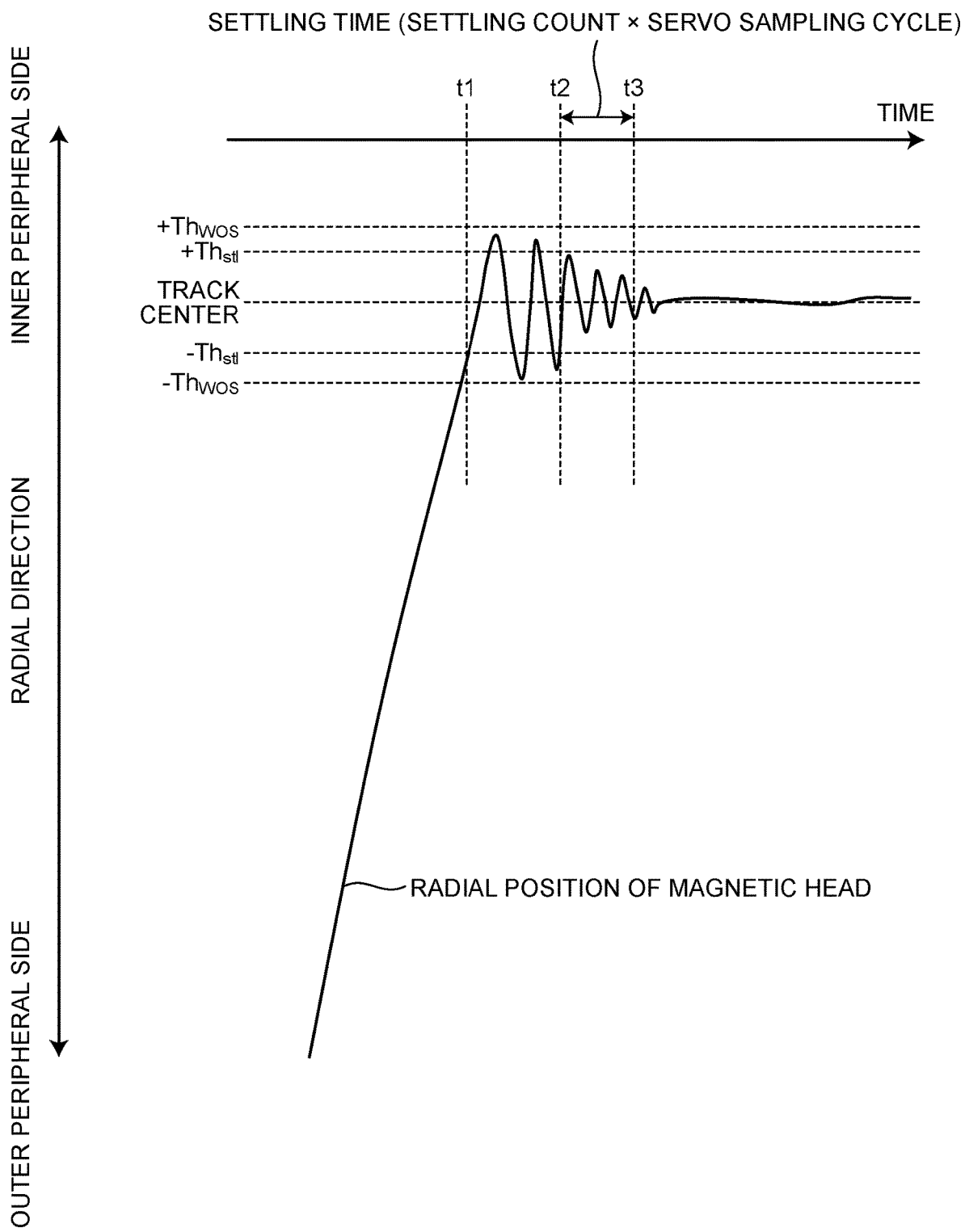
FIG. 3 is a diagram for describing a settling operation of the first embodiment.

FIG. 3 is a diagram for describing the settling operation of the first embodiment.

In the settling operation, a threshold $Th_{stl}$ is used for determining whether or not the residual vibration of the magnetic head 22 has sufficiently attenuated. The threshold $Th_{stl}$ is referred to as a settling threshold $Th_{stl}$. Note that the settling threshold $Th_{stl}$ is an example of the first threshold.

The controller 30 compares the positioning error amount with the settling threshold $Th_{stl}$ to determine whether or not the radial position of the magnetic head 22 falls within a range between $-Th_{stl}$ and $+Th_{stl}$ that is based on the track center of the target track.

In FIG. 3, a radial position is expressed with an outer peripheral side as a negative direction and an inner peripheral side as a positive direction. The setting of the negative direction and the positive direction at the radial position is not limited thereto.

In one example, in the seek operation of moving the magnetic head 22 to the target track, the controller 30 starts the settling operation at timing (for example, timing t1 in FIG. 3) at which the positioning error amount first becomes equal to or less than the settling threshold $Th_{stl}$.

In the settling operation, the controller 30 acquires a length of a time period during which the positioning error amount is maintained at the settling threshold $Th_{stl}$ or less. When the length of the time period during which the positioning error amount is maintained at the settling threshold $Th_{stl}$ or less reaches the preset settling time, the controller 30 ends the settling operation and enters a state where the write operation to the target track is enabled.

As described above, the controller 30 acquires the positioning error amount on the basis of the servo data read from the magnetic disk 11. Specifically, the controller 30 sequentially acquires the positioning error amount in a cycle in which the magnetic head 22 passes through the servo region 41, that is, a servo sampling cycle. Therefore, the number of times the positioning error amount equal to or less than the settling threshold $Th_{stl}$ is continuously acquired is used by the controller 30 as the amount corresponding to the length of the time period during which the positioning error amount is maintained at the settling threshold $Th_{stl}$ or less. In other words, the number of times the positioning error amount being equal to or less than the settling threshold $Th_{stl}$ is continuously acquired is a servo sampling number at which the positioning error amount equal to or less than the settling threshold $Th_{stl}$ is continuously acquired. The servo sampling number is the number of times of acquisition of servo data.

When the positioning error amount being equal to or less than the settling threshold $Th_{stl}$ is acquired, the controller 30 increments the count value of the servo sampling number. When the positioning error amount exceeding the settling threshold $Th_{stl}$ is acquired, the controller 30 resets the count value to 0. By repeating these processes, the number of times of continuously acquiring the positioning error amount being equal to or less than the settling threshold $Th_{stl}$ is counted. When the count value reaches the value corresponding to the settling time, the controller 30 ends the settling operation.

Hereinafter, the number of times corresponding to the settling time is referred to as a settling count. The settling time corresponds to a value obtained by multiplying the settling count by the servo sampling cycle.

In the example illustrated in FIG. 3, all the acquired positioning error amounts are maintained at the settling threshold $Th_{stl}$ or less from timing t2 when the positioning error amount becomes the settling threshold $Th_{stl}$ or less to timing t3 after the settling time. Therefore, the controller 30 ends the settling operation at the timing t3 and performs the write operation to the target track.

Note that, in FIG. 3, a line corresponding to an off-track slice (off-track slice $Th_{WOS}$) used for determining the on-track state is drawn. When the radial position of the magnetic head 22 falls outside the range between $-Th_{WOS}$ and $+Th_{WOS}$ that is based on the track center of the target track, the controller 30 interrupts the write operation and performs the retry write operation. In the example illustrated in FIG. 3, the write off-track slice $Th_{WOS}$ is larger than the settling threshold $Th_{stl}$, but a magnitude relationship between the write off-track slice $Th_{WOS}$ and the settling threshold $Th_{stl}$ is not limited thereto. The write off-track slice $Th_{WOS}$ and the settling threshold $Th_{stl}$ may be the same.

A technique to be compared with the embodiment of the present disclosure will be described. A technique to be compared with the embodiment is referred to as a comparative example.

According to the comparative example, the settling count is determined at the time of design of the magnetic disk apparatus. After shipment, the magnetic disk apparatus performs the settling operation by using the settling count determined at the time of design.

However, the behavior of the residual vibration due to the seek operation may change with environmental factors, aging, and the like. The environmental factors include temperature in the installed environment, vibration received from the installed environment, a method of fixing the magnetic disk apparatus, etc. Due to the change in the behavior of the residual vibration due to the seek operation, the settling count determined at the time of design may not be sufficient for determining whether or not the residual vibration is sufficiently attenuated. In other words, even when the settling operation ends, there may be a case where the residual vibration has not yet been sufficiently attenuated in practice. In such a case, the positioning error amount may exceed the write off-track slice immediately after the start of the write operation, and the write operation may stop.

When a sufficiently large value is set as the settling count at the time of design such that the settling count does not become insufficient, it is possible to prevent the write operation from stopping immediately after the start of the write operation. However, when the settling count is too large, the seek time (that is, the time required for the seek operation) becomes long, and the performance of the magnetic disk apparatus deteriorates.

Therefore, in the first embodiment, the controller 30 is configured to autonomously determine the settling count in accordance with the behavior of the residual vibration. More specifically, the controller 30 estimates a frequency and an amplitude of the residual vibration during the settling operation, and determines the setting value of the settling count on the basis of an estimated value of the frequency and an estimated value of the amplitude.

Figure 4:
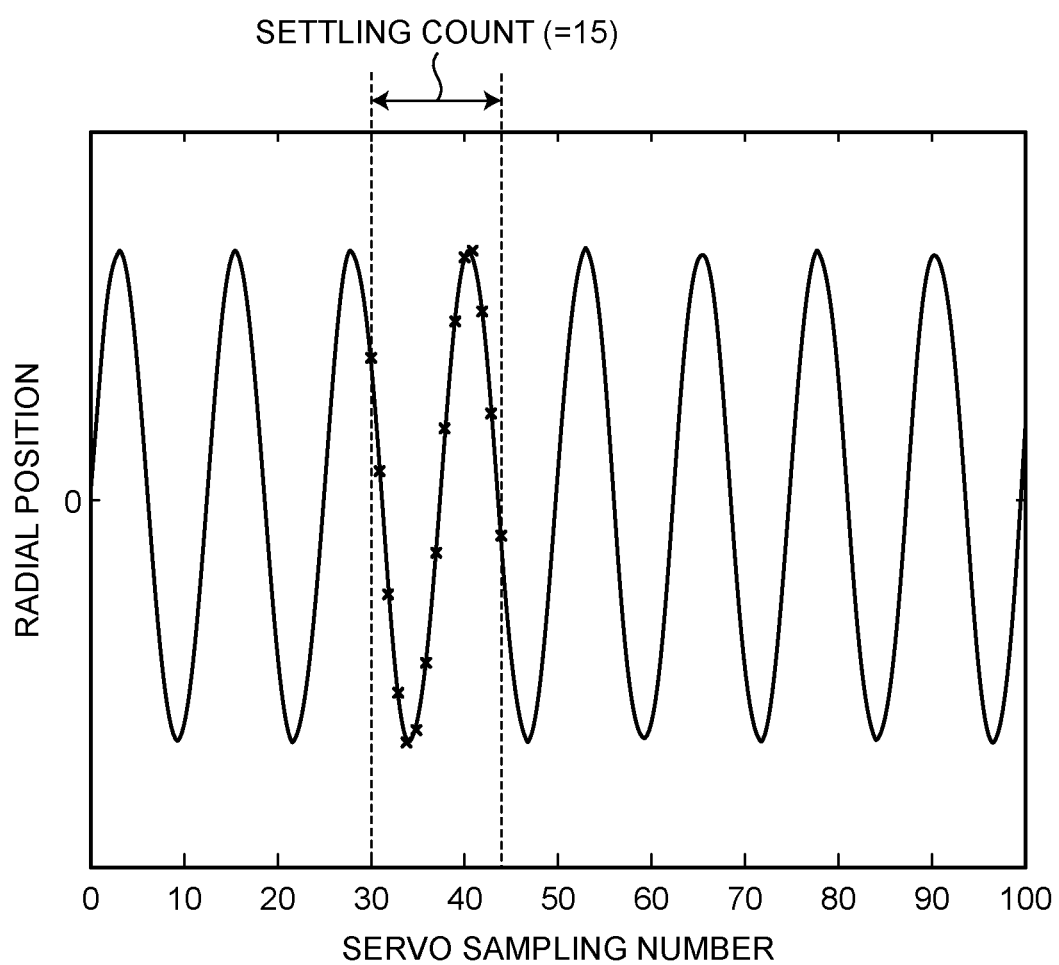
FIG. 4 is a diagram for describing an example of a settling count determination method according to the first embodiment.

FIG. 4 is a diagram for describing an example of a settling count determination method according to the first embodiment. In the drawing, a temporal transition of the radial position of the magnetic head 22 when the magnetic head 22 vibrates in the radial direction at an optional frequency is plotted. Note that a vertical axis represents the radial position of the magnetic head 22, and a horizontal axis represents the servo sampling number.

A time length of one cycle of vibration illustrated in FIG. 4 corresponds to the servo sampling number "15". Therefore, the controller 30 sets the servo sampling number "15" as the settling count.

By setting the servo sampling number corresponding to one cycle of vibration as the settling count, it is possible to end the settling operation when it is confirmed that the maximum value of the positioning error amount is equal to or less than the settling threshold $Th_{stl}$. This ensures that the vibration amplitude after the end of the settling operation becomes equal to or less than the settling threshold $Th_{stl}$. After the start of the write operation, the positioning error amount is prevented from exceeding the write off-track slice due to the residual vibration.

Moreover, in a case where the residual vibration includes two vibrations with large amplitude and different frequencies, those two vibrations may cause a beat. In such a case, even when the servo sampling number corresponding to the time length of one cycle of any of the two vibrations is set as the settling count, it is not guaranteed that the vibration amplitude after the end of the settling operation becomes equal to or less than the settling threshold $Th_{stl}$.

According to the first embodiment, the servo sampling number corresponding to one cycle of beat can also be set as the settling count.

Figure 5:
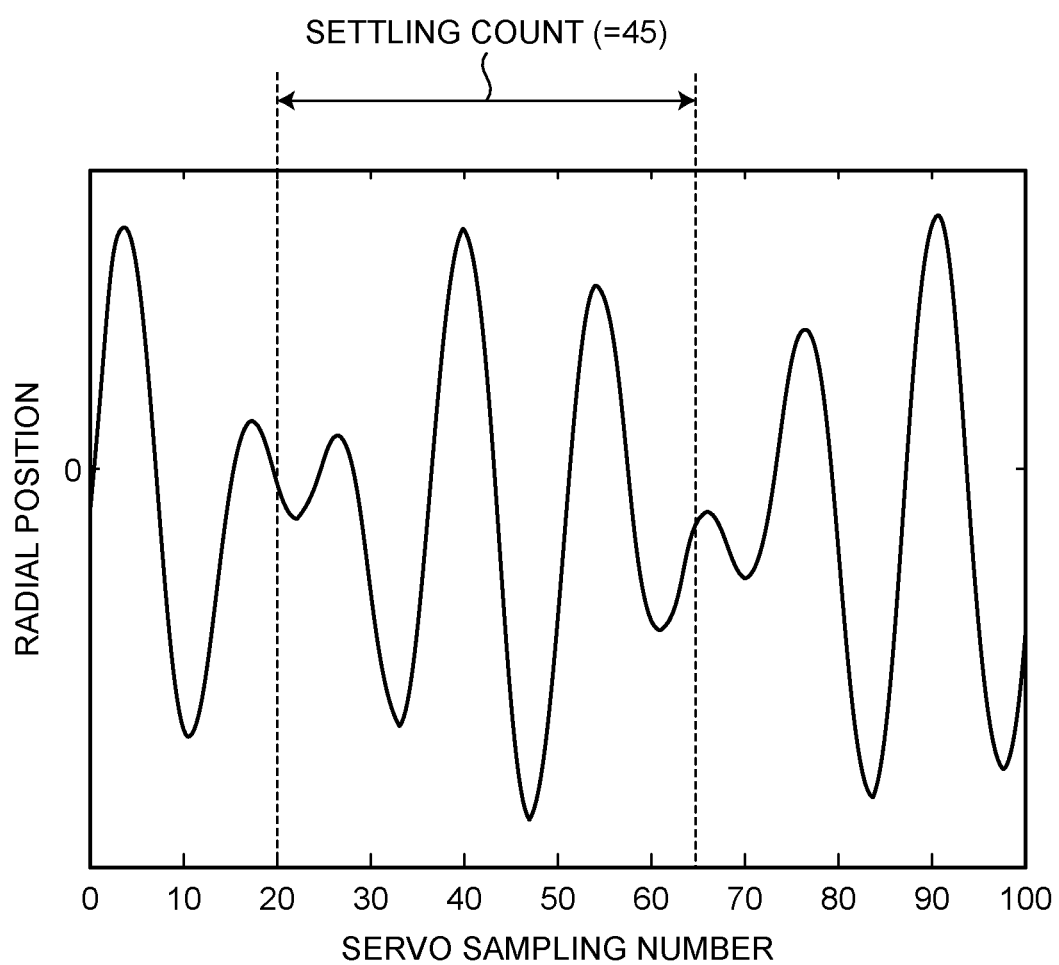
FIG. 5 is a diagram for describing another example of the settling count determination method according to the first embodiment.

FIG. 5 is a diagram for describing another example of the settling count determination method according to the first embodiment. A vertical axis represents the radial position of the magnetic head 22, and a horizontal axis represents the servo sampling number.

In the example illustrated in FIG. 5, the residual vibration of the magnetic head 22 includes two vibrations with substantially the same amplitude and different frequencies, and thereby a large beat is caused in the residual vibration of the magnetic head 22. One cycle of the beat corresponds to the servo sampling number "45". Therefore, the controller 30 sets the servo sampling number "45" as the settling count.

The servo sampling number corresponding to one cycle of the beat is set as the settling count. As a result, it is possible to end the settling operation when it is confirmed that the maximum value of the positioning error amount is equal to or less than the settling threshold $Th_{stl}$ even in a case where the above-described beat occurs.

Next, an example of the operation of the magnetic disk apparatus 1 of the first embodiment will be described. Here, it is assumed that the controller 30 is configured to be able to estimate the frequency and the amplitude with respect to two vibrations out of multiple vibrations included in the residual vibration.

Figure 6:
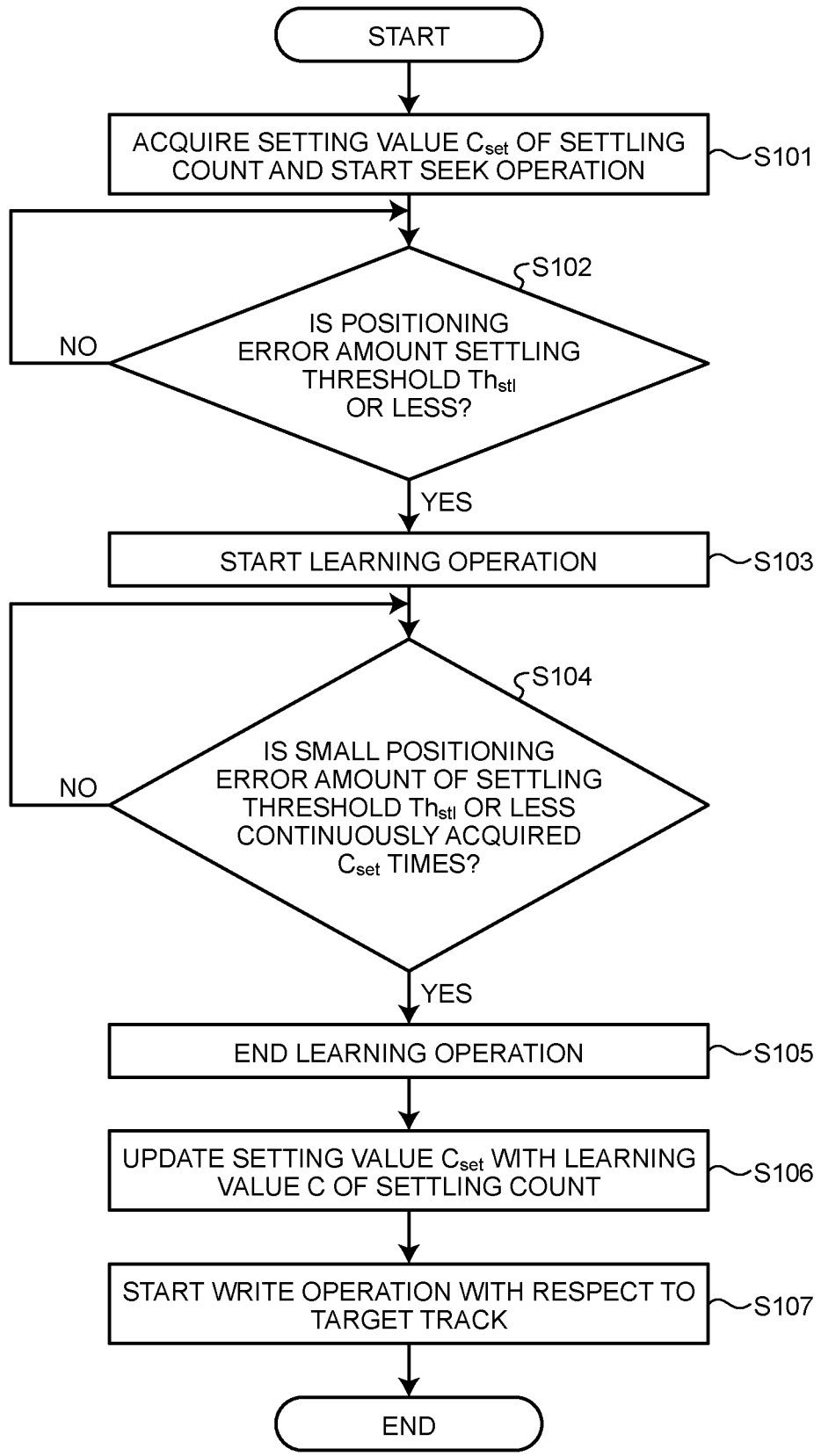
FIG. 6 is a flowchart for describing an example of an operation related to a seek operation according to the first embodiment.

FIG. 6 is a flowchart for describing an example of an operation related to the seek operation according to the first embodiment. Here, an operation related to the seek operation for executing the write operation will be described.

First, the controller 30 acquires a setting value $C_{set}$ of the settling count and starts the seek operation (S101). The setting value $C_{set}$ of the settling count has been stored in a predetermined storage area. The controller 30 reads the setting value $C_{set}$ of the settling count from the predetermined storage area. Note that the predetermined storage area may be located in the RAM 27, the FROM 28, or others.

The controller 30 determines whether the positioning error amount is equal to or less than the settling threshold $Th_{stl}$ (S102). When No is determined in the determination processing of S102, the controller 30 executes the determination processing of S102 again.

In a case where Yes is determined in the determination processing of S102, the controller 30 starts a learning operation of learning the settling count (S103) and starts the settling operation. Details of the learning operation will be described later.

In the settling operation, the controller 30 determines whether the positioning error amount equal to or less than the settling threshold $Th_{stl}$ is continuously acquired $C_{set}$ times (S104).

When No is determined in the determination processing of S104, the controller 30 executes the determination processing of S104 again.

In a case where Yes is determined in the determination processing of S104, the controller 30 ends the learning operation (S105).

The controller 30 updates the setting value $C_{set}$ with a learning value C of the settling count obtained by the learning operation (S106). Then, the controller 30 starts the write operation with respect to the target track (S107), and a series of operations related to the seek operation ends.

Figure 7:
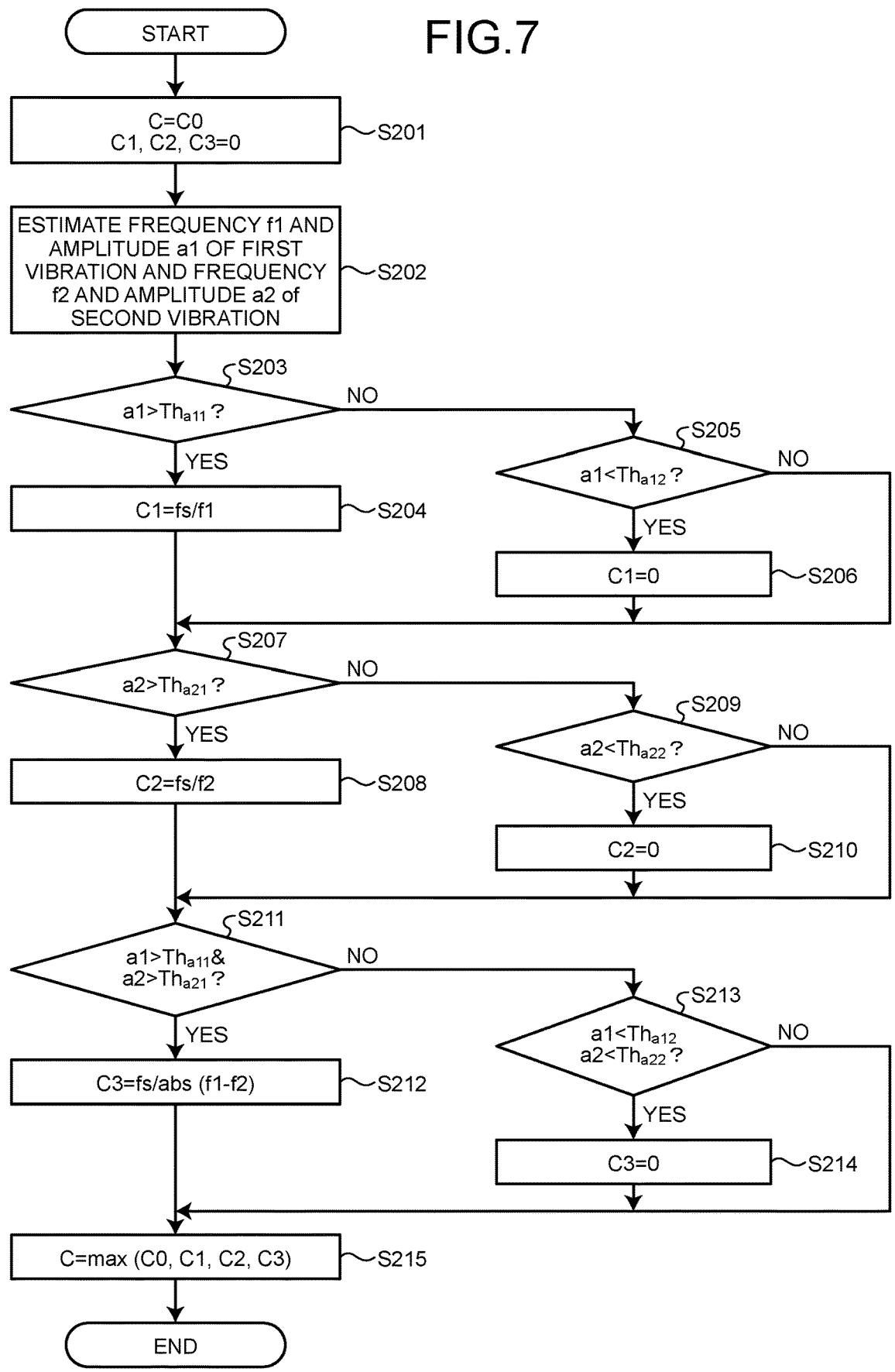
FIG. 7 is a flowchart for describing an example of a learning operation according to the first embodiment.

FIG. 7 is a flowchart for describing an example of the learning operation according to the first embodiment.

In the example illustrated in FIG. 7, the controller 30 uses C, C1, C2, and C3 as parameters related to the settling count. As described above, the controller 30 estimates the frequency and the amplitude for two vibrations with different frequencies included in the residual vibration. One of the two vibrations is referred to as a first vibration, and the other one is referred to as a second vibration. The parameter C1 is a parameter in which a learning value of the settling count with consideration for only the first vibration is temporarily set. The parameter C2 is a parameter in which a learning value of the settling count with consideration for only the second vibration is temporarily set. The parameter C3 is a parameter in which a learning value of the settling count with consideration for only the beat caused by the first vibration and the second vibration is temporarily set.

Hereinafter, the estimated value of the frequency of the first vibration is referred to as a frequency estimation value f1, and the estimated value of the frequency of the second vibration is referred to as a frequency estimation value f2. The estimated value of the amplitude of the first vibration is referred to as an amplitude estimation value a1, and the estimated value of the amplitude of the second vibration is referred to as an amplitude estimation value a2.

First, the controller 30 sets an initial setting value C0 of the settling count to the parameter C, and sets 0 to the parameters C1, C2, and C3 (S201). C0 is determined by, for example, a designer at the time of design and is stored in a predetermined storage area. In S201, the controller 30 reads C0 from the predetermined storage area.

Subsequently, the controller 30 estimates the frequency and amplitude of the vibration included in the residual vibration on the basis of the sequentially acquired positioning error amount. The controller 30 includes two frequency/amplitude estimators. The controller 30 estimates a frequency f1 and an amplitude a1 of the first vibration and a frequency f2 and an amplitude a2 of the second vibration by using the two frequency/amplitude estimators (S202).

Note that an optional algorithm can be applied for estimating the frequency and the amplitude by the frequency/amplitude estimator. In one example, the frequency/amplitude estimator may be configured as an adaptive filter to estimate the frequency and amplitude. In another example, the frequency/amplitude estimator may be configured to estimate the frequency and amplitude by discrete Fourier transform.

For each of the first vibration and the second vibration, the controller 30 calculates the settling count only when the corresponding amplitude estimation value is large. Therefore, a threshold (referred to as an amplitude threshold) to be compared with the amplitude of each vibration has been set in advance.

In the example illustrated in FIG. 7, $Th_{a11}$ and $Th_{a12}$ are set as amplitude thresholds to be compared with the amplitude estimation value a1. $Th_{a21}$ and $Th_{a22}$ are set as amplitude thresholds to be compared with the amplitude estimation value a2. The amplitude threshold $Th_{a11}$ is larger than the amplitude threshold $Th_{a12}$. The amplitude threshold $Th_{a21}$ is larger than the amplitude threshold $Th_{a22}$. The amplitude thresholds $Th_{a11}$, $Th_{a12}$, $Th_{a21}$, and $Th_{a22}$ are examples of the second threshold.

The controller 30 determines whether the amplitude estimation value a1 is larger than the amplitude threshold $Th_{a11}$ (S203). When Yes is determined in the determination processing of S203, the controller 30 sets a value obtained by dividing the servo sampling frequency fs by the frequency estimation value f1 as the parameter C1 (S204).

By the processing of S204, the settling count that can be used for determining whether or not the first vibration is sufficiently attenuated is set as the parameter C1.

When No is determined in the determination processing of S203, the controller 30 determines whether the amplitude estimation value a1 is smaller than the amplitude threshold $Th_{a12}$ (S205). When Yes is determined in the determination processing of S205, the controller 30 sets 0 to the parameter C1 (S206).

After the processing of S204, or when No is determined in the determination processing of S205, or after the processing of S206, the controller 30 determines whether the amplitude estimation value a2 is larger than the amplitude threshold $Th_{a21}$ (S207). When Yes is determined in the determination processing of S207, the controller 30 sets a value obtained by dividing the servo sampling frequency fs by the frequency estimation value f2 as the parameter C2 (S208).

By the processing of S208, the settling count that can be used for determining whether or not the second vibration is sufficiently attenuated is set as the parameter C2.

When No is determined in the determination processing of S207, the controller 30 determines whether the amplitude estimation value a2 is smaller than the amplitude threshold $Th_{a22}$ (S209). When Yes is determined in the determination processing of S209, the controller 30 sets 0 as the parameter C2 (S210).

After the processing of S208, or when No is determined in the determination processing of S209, or after the processing of S210, the controller 30 determines whether the amplitude estimation value a1 is larger than the amplitude threshold $Th_{a11}$ and the amplitude estimation value a2 is larger than the amplitude threshold $Th_{a21}$ (S211).

When Yes is determined in the determination processing of S211, the controller 30 sets a value obtained by dividing the servo sampling frequency fs by an absolute value of the difference between the frequency estimation value f1 and the frequency estimation value f2 as the parameter C3 (S212).

By the processing of S212, the settling count that can be used for determining whether the vibration by the beat caused by the first vibration and the second vibration is sufficiently attenuated is set as the parameter C3.

In a case where No is determined in the determination processing of S211, the controller 30 determines whether or not the amplitude estimation value a1 is smaller than the amplitude threshold $Th_{a12}$ and the amplitude estimation value a2 is smaller than the amplitude threshold $Th_{a22}$ (S213).

When Yes is determined in the determination processing of S213, the controller 30 sets 0 to the parameter C3 (S214).

After the processing of S212, or when No is determined in the determination processing of S213, or after the processing of S214, the controller 30 determines the maximum value among C0, C1, C2, and C3 as the learning value C of the settling count (S215).

The maximum value among C0, C1, C2, and C3 is also a value obtained by multiplying a reciprocal of the minimum value among the frequency f1 of the first vibration, the frequency f2 of the second vibration, and the difference between the frequency f1 and the frequency f2 by the servo sampling frequency.

By the processing of S215, even when the residual vibration includes two vibrations with different frequencies and a large beat due to the two vibrations occurs, a settling count that can be used for determining whether or not all of the two vibrations and the vibration of the beat have sufficiently attenuated is obtained.

After the processing of S215, the learning operation ends.

In the above description, when the write operation is executed, the seek operation, the settling operation, and the learning operation illustrated in FIGS. 6 and 7 are executed. Even when the read operation is executed, these operations can be executed.

In addition, in the example illustrated in FIG. 7, two amplitude thresholds having different magnitudes are used for each of the first vibration and the second vibration, so that a dead zone occurs on the setting of C1, C2, and C3. The dead zone is provided for the setting of C1, C2, and C3 for the following reason. The processing of S202 to S215 can be repeatedly executed during one settling operation. In such a case, if no dead zone is provided, that is, if determination is made by using a single amplitude threshold for each of the first vibration and the second vibration, the control becomes unstable. To prevent the control from becoming unstable, two amplitude thresholds with different magnitudes are used for each of the first vibration and the second vibration. Note that one amplitude threshold may be used for each of the first vibration and the second vibration.

In the above description, the controller 30 is configured to estimate the frequency and the amplitude for the two vibrations included in the residual vibration. The number of vibrations that the controller 30 can estimate the frequency and the amplitude is optionally as long as it is one or more.

For example, when the controller 30 can estimate the frequency and the amplitude only for one vibration, the controller 30 updates the setting value $C_{set}$ of the settling count on the basis of the frequency estimation value and the amplitude estimation value of the vibration. Specifically, when the amplitude estimation value is larger than the amplitude threshold, the controller 30 updates the setting value $C_{set}$ of the settling count with a value based on the frequency estimation value. Specifically, the value based on the frequency estimation value is a value obtained by dividing the servo sampling frequency fs by the frequency estimation value.

Moreover, for example, in a case where the controller 30 can estimate the frequency and the amplitude for two or more vibrations, the controller 30 may operate as follows. Specifically, when the residual vibration includes two or more vibrations whose amplitude estimation values are larger than the amplitude threshold, the controller 30 updates the setting value $C_{set}$ of the settling count on the basis of the frequency estimation value of each of the two or more vibrations and the difference between the frequency estimation values of the two or more vibrations. Specifically, the controller 30 multiplies the reciprocal of the minimum value among: the frequency estimation value of each of the two or more vibrations whose amplitude estimation value is larger than the amplitude threshold, and the difference between the frequency estimation values of the two or more vibrations by the servo sampling frequency. The controller 30 then updates the setting value $C_{set}$ of the settling count with the value obtained by the multiplication.

In the above description, the setting value $C_{set}$ of one settling count is commonly used in the entire magnetic disk apparatus 1. The controller 30 may be configured to store multiple setting values $C_{set}$, and select a setting value $C_{set}$ to be used and updated from among the multiple setting values $C_{set}$ in accordance with a condition. For example, a different setting value $C_{set}$ may be used and updated for each seek distance. Alternatively, the magnetic disk 11 may be divided into plural regions in the radial direction, and different setting values $C_{set}$ may be used and updated for each seek destination region. Alternatively, in a case where two or more magnetic heads 22 are mounted, different setting values $C_{set}$ may be used and updated for each head.

As described above, according to the first embodiment, the controller 30 moves the magnetic head 22 to the target track, and executes access to the target track after the positioning error amount equal to or less than the settling threshold $Th_{stl}$ is continuously acquired $C_{set}$ times. At this time, the controller 30 estimates the frequency and the amplitude of the residual vibration, and updates the setting value $C_{set}$ of the settling count on the basis of the frequency estimation value of the residual vibration and the amplitude estimation value of the residual vibration.

Therefore, it is possible to set an appropriate time length on the basis of the frequency of the residual vibration actually occurring as the settling time. In other words, it is possible to suitably determine whether or not the residual vibration of the magnetic head 22 is sufficiently attenuated.

According to the first embodiment, when the amplitude estimation value is larger than the amplitude threshold, the controller 30 updates the setting value $C_{set}$ of the settling count with a value obtained by dividing the servo sampling frequency fs by the frequency estimation value.

Additionally, according to the first embodiment, when the residual vibration includes two or more vibrations whose amplitude estimation values are larger than the amplitude threshold, the controller 30 updates the setting value $C_{set}$ of the settling count on the basis of the frequency estimation value of each of the two or more vibrations and the difference between the frequency estimation values of the two or more vibrations. Specifically, the controller 30 multiplies the reciprocal of the minimum value among: the frequency estimation value of each of the two or more vibrations whose amplitude estimation value is larger than the amplitude threshold, and the difference between the frequency estimation values of the two or more vibrations by the servo sampling frequency, and updates the setting value $C_{set}$ of the settling count with the value obtained by the multiplication.

Therefore, even when a large undulation occurs due to plural vibrations, it is ensured that the vibration amplitude after the end of the settling operation is equal to or less than the settling threshold $Th_{stl}$. As a result, after the start of the write operation, the positioning error amount is prevented from exceeding the write off-track slice due to the residual vibration.

Second Embodiment

The servo data used for acquiring the positioning error amount can be obtained only from servo regions 41 arranged at intervals in a circumferential direction. Therefore, when the magnetic head 22 is located between the servo regions 41, the controller 30 cannot obtain the radial position. Therefore, even when it is confirmed, on the basis of the servo data, that the positioning error amount is the write off-track slice or the like, the radial position of the magnetic head 22 may fall outside the range between $-Th_{WOS}$ and $+Th_{WOS}$ that is based on the track center due to disturbance or the like between the servo regions 41. Such a deviation of the position of the magnetic head 22 from the range of $-Th_{WOS}$ to $+Th_{WOS}$ is referred to as overrun.

The distance by which the radial position of the magnetic head 22 falls outside the range between $-Th_{WOS}$ and $+Th_{WOS}$ based on the track center due to overrun is proportional to the maximum radial speed of the magnetic head 22. The maximum radial speed of the magnetic head 22 after the settling operation depends on the frequency and amplitude of the residual vibration. The higher the frequency of the residual vibration, the higher the maximum radial speed of the magnetic head 22 after the settling operation, and the higher the amplitude of the residual vibration, the higher the maximum radial speed of the magnetic head 22 after the settling operation.

In the second embodiment, the controller 30 updates the setting value $C_{set}$ of the settling count and updates the settling threshold $Th_{stl}$ or the write off-track slice $Th_{WOS}$.

In the following description of the second embodiment, the same matters as those of the first embodiment will be omitted.

Figure 8:
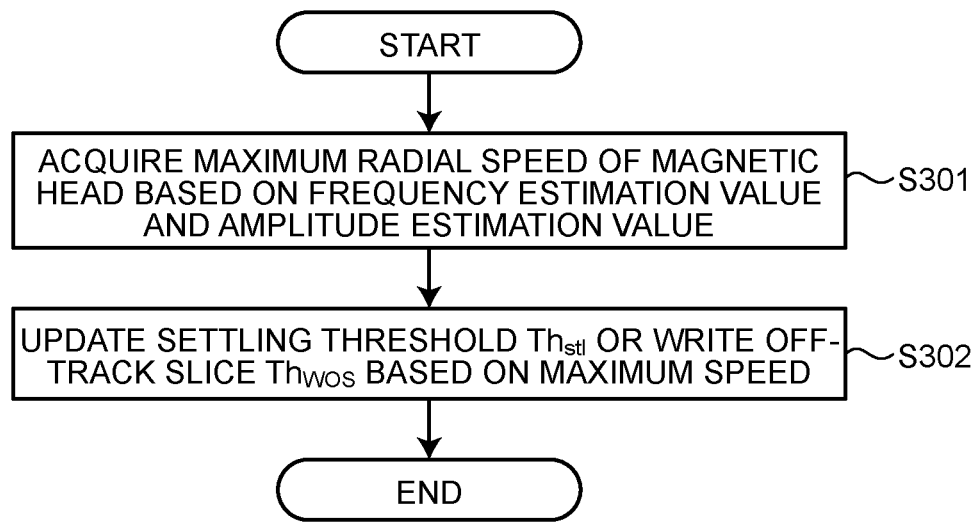
FIG. 8 is a flowchart illustrating an example of an operation of a magnetic disk apparatus 1 of a second embodiment.

FIG. 8 is a flowchart illustrating an example of the operation of the magnetic disk apparatus 1 of the second embodiment. A series of operations illustrated in the drawing is performed as part of the learning operation.

The controller 30 acquires the maximum radial speed of the magnetic head 22 on the basis of the frequency estimation value and the amplitude estimation value obtained in the learning operation (S301).

For example, a temporal transition x(t) of the displacement of sine wave of a frequency $f_i$ and an amplitude $a_i$ can be expressed by the following Expression (1).

$$x(t)=a_i \sin(2\pi f_i t) \quad (1)$$

By time-differentiating with respect to x(t), the temporal transition v(t) of the speed in the following Expression (2) is obtained.

$$v(t)=2\pi f_i \cdot a_i \cos(2\pi f_i t) \quad (2)$$

Therefore, the maximum speed of the sine wave having the frequency $f_i$ and the amplitude $a_i$ can be expressed by the following Expression (3).

$$\max(v(t))=2\pi f_i \cdot a_i \quad (3)$$

The controller 30 can acquire the maximum radial speed of the magnetic head 22 by substituting the frequency estimation value and the amplitude estimation value into Expression (3). Note that the controller 30 may store in advance information recording a relationship between the frequency, the amplitude, and the maximum radial speed of the magnetic head 22, and acquire the maximum radial speed of the magnetic head 22 on the basis of this information.

Subsequently, the controller 30 updates the settling threshold $Th_{stl}$ or the write off-track slice $Th_{WOS}$ on the basis of the acquired maximum speed (S302). Then, the operation ends.

In the processing of S302, the controller 30 decreases the settling threshold $Th_{stl}$ as the acquired maximum speed increases. As a result, it is possible to reduce the risk that the positioning error amount exceeds the write off-track slice during the write operation after the settling operation.

Alternatively, the controller 30 decreases the write off-track slice $Th_{WOS}$ as the acquired maximum speed increases. The higher the maximum speed, the longer the distance of overrun, which increases the risk of destroying the data of the track adjacent to the target track. By reducing the write off-track slice $Th_{WOS}$ as the acquired maximum speed increases, it is possible to reduce the risk that the data of the track adjacent to the target track is destroyed by overrun.

Third Embodiment

The learning value C of the settling count obtained by the learning operation of the first embodiment may be significantly large at times. When the setting value $C_{set}$ of the settling count is updated with such a large learning value C, the time required for the subsequent settling operation becomes longer, and the seek time becomes longer.

In the third embodiment, the controller 30 updates the setting value $C_{set}$ with a value smaller than the learning value C. At the same time, the controller 30 decreases the settling threshold $Th_{stl}$.

Only by updating the setting value $C_{set}$ with a value smaller than the learning value C, it is not guaranteed that the vibration amplitude after the end of the settling operation becomes equal to or less than the settling threshold $Th_{stl}$.

For example, when the servo sampling number corresponding to 0.75 cycles of vibration is set as the setting value of the settling count, the guaranteed vibration amplitude is $Th_{stl}*(1+\mathrm{sqrt}(2)/2)/2$. Note that the sign "*" is an operator representing multiplication, and the sign "sqrt" is an operator representing a square root operation.

Figure 9:
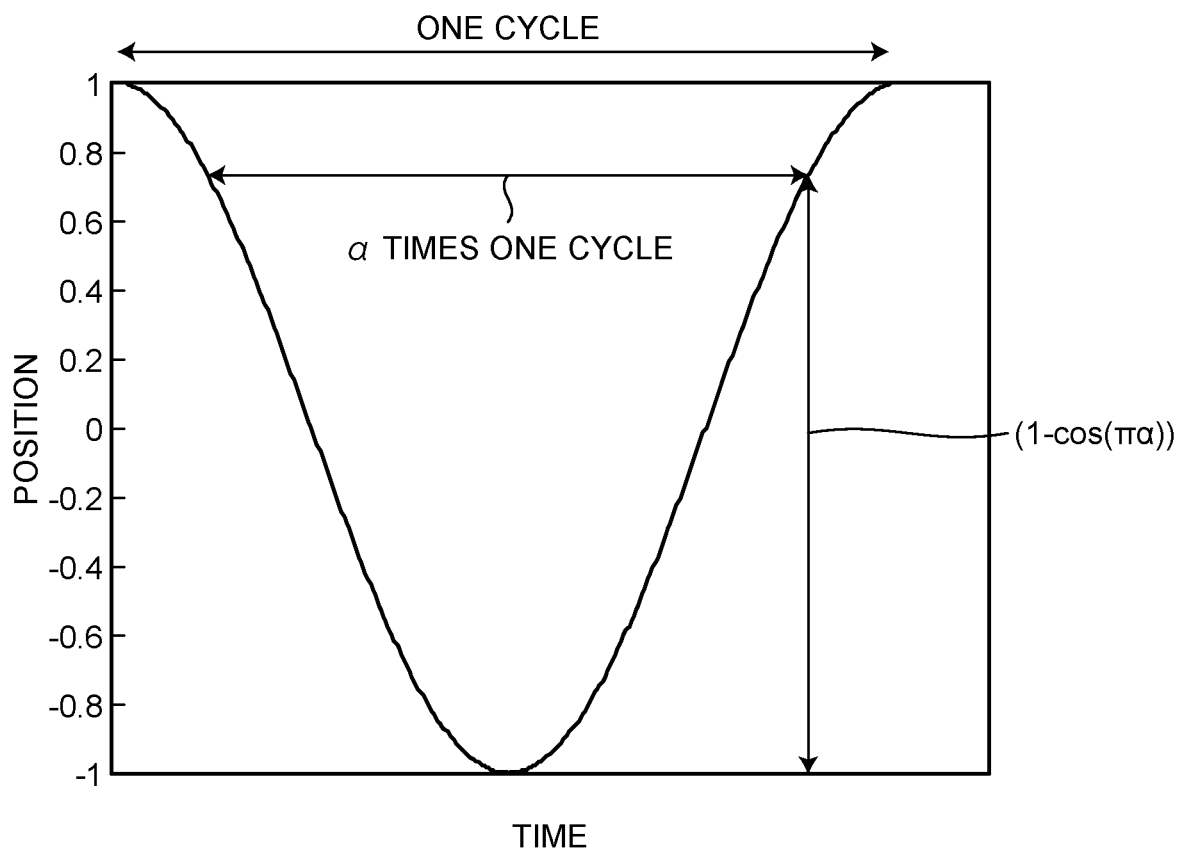
FIG. 9 is a diagram for describing a relationship between a settling count and a guaranteed width.

FIG. 9 is a diagram for describing the relationship between the settling count and the guaranteed width. In the drawing, a horizontal axis represents time and a vertical axis represents position. The displacement of the magnetic head 22 vibrating at a certain frequency is plotted.

From FIG. 9, it can be seen that in a case where a value corresponding to a time length of a times one cycle (where a is a real number of 0 or more and 1 or less) is set as the setting value of the settling count, a ratio r of the guaranteed minimum width to the amplitude of vibration can be expressed by the following Expression (4).

$$r=(1-\cos(\pi a))/2 \qquad (4)$$

Therefore, by updating the setting value $C_{set}$ with a value smaller than the learning value C and decreasing the settling threshold $Th_{stl}$, the controller 30 can guarantee that the vibration amplitude after the end of the settling operation is equal to or less than the settling threshold $Th_{stl}$.

Hereinafter, a third embodiment will be described. In the description of the third embodiment, the same matters as those of the first embodiment will be omitted.

Figure 10:
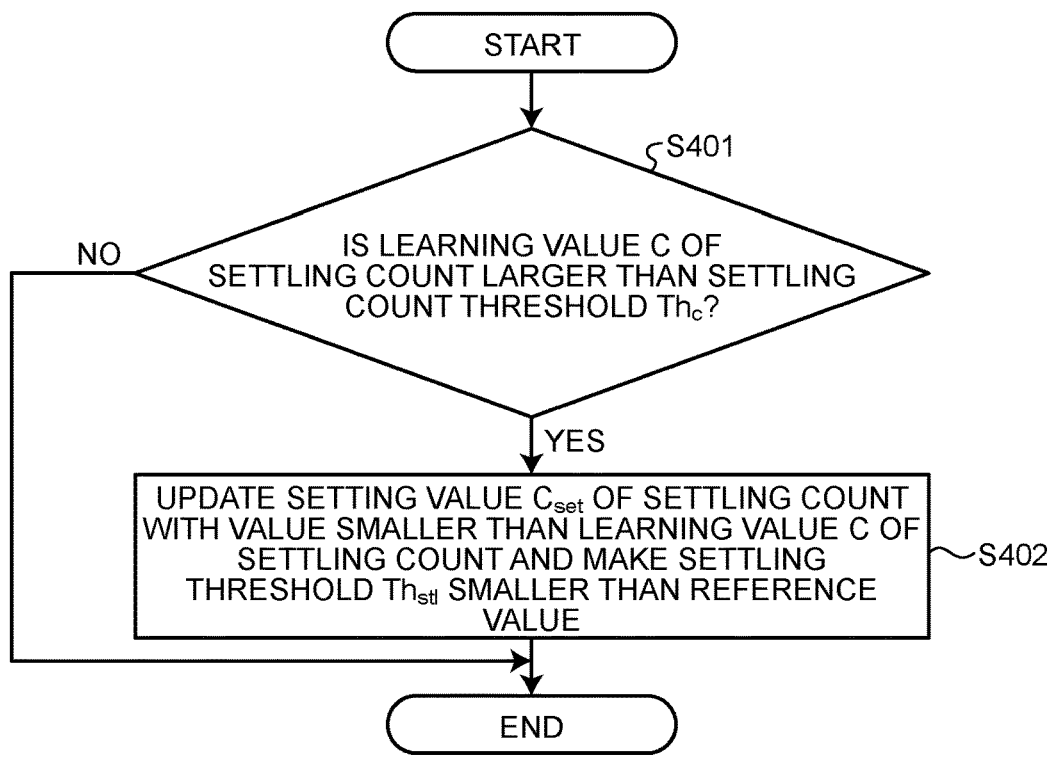
FIG. 10 is a flowchart for describing an example of an operation of a magnetic disk apparatus 1 of a third embodiment.

FIG. 10 is a flowchart for describing an example of the operation of the magnetic disk apparatus 1 of the third embodiment. A series of operations illustrated in the drawing is performed as part of the learning operation.

The controller 30 determines whether or not the learning value C of the settling count obtained by the learning operation is larger than a predetermined threshold (settling count threshold $Th_c$) (S401). The settling count threshold $Th_c$ is determined in advance at the time of design or the like.

In a case where Yes is determined in the determination processing of S401, the controller 30 updates the setting value $C_{set}$ of the settling count with a value smaller than the learning value C of the settling count, and makes the settling threshold $Th_{stl}$ smaller than the reference value (S402). The reference value is, for example, an initial setting value of the settling threshold $Th_{stl}$.

In a case where No is determined in the determination processing of S401, or after the processing of S402, the operation of the magnetic disk apparatus 1 of the third embodiment ends.

According to the example illustrated in FIG. 10, the determination as to whether or not to reduce the setting value $C_{set}$ of the settling count and the settling threshold $Th_{stl}$ is performed on the basis of the comparison between the learning value C of the settling count and the settling count threshold $Th_c$. The condition for decreasing the setting value $C_{set}$ of the settling count and the settling threshold $Th_{stl}$ is not limited thereto. In addition, the setting value $C_{set}$ of the settling count and the settling threshold $Th_{stl}$ may be unconditionally reduced.

In this manner, the controller 30 updates the setting value $C_{set}$ of the settling count with a value smaller than the learning value C, and decreases the settling threshold $Th_{stl}$ in accordance with the update of the setting value $C_{set}$ of the settling count.

Therefore, it is possible to guarantee that the vibration amplitude after the end of the settling operation is equal to or less than the settling threshold $Th_{stl}$, and it is possible to suppress the seek time.

Fourth Embodiment

The controller 30 accumulates the access command received from the host 2 in a command queue allocated to the RAM 27 or the like. Then, when executing the access commands accumulated in the command queue, the controller 30 executes the command reordering operation. The command reordering operation is an operation of determining the execution order of the commands without depending on the order in which each command is received from the host 2 such that the time required to execute the access commands becomes as short as possible.

More specifically, the controller 30 stores a reordering table in which estimated values of seek times under different conditions have been recorded. In one example, the condition is a seek distance. The controller 30 acquires the execution order of the access commands that requires the least time by using the estimated value under each condition recorded in the reordering table. Then, the controller 30 executes the access commands in the acquisition order.

As described above, the seek time changes with the update of the setting value $C_{set}$ of the settling count. In a case where the seek time changes (in particular, in a case where the seek time becomes long), the optimal command reordering operation cannot be performed, and the performance of the magnetic disk apparatus is deteriorated.

Therefore, in the fourth embodiment, the controller 30 updates the reordering table in accordance with the update of the setting value $C_{set}$ of the settling count. As a result, a decrease in the performance of the magnetic disk apparatus 1 due to a decrease in the efficiency of the command reordering operation is suppressed.

Hereinafter, the fourth embodiment will be described. In the description of the fourth embodiment, the same matters as those of the first embodiment will be omitted.

Figure 11:
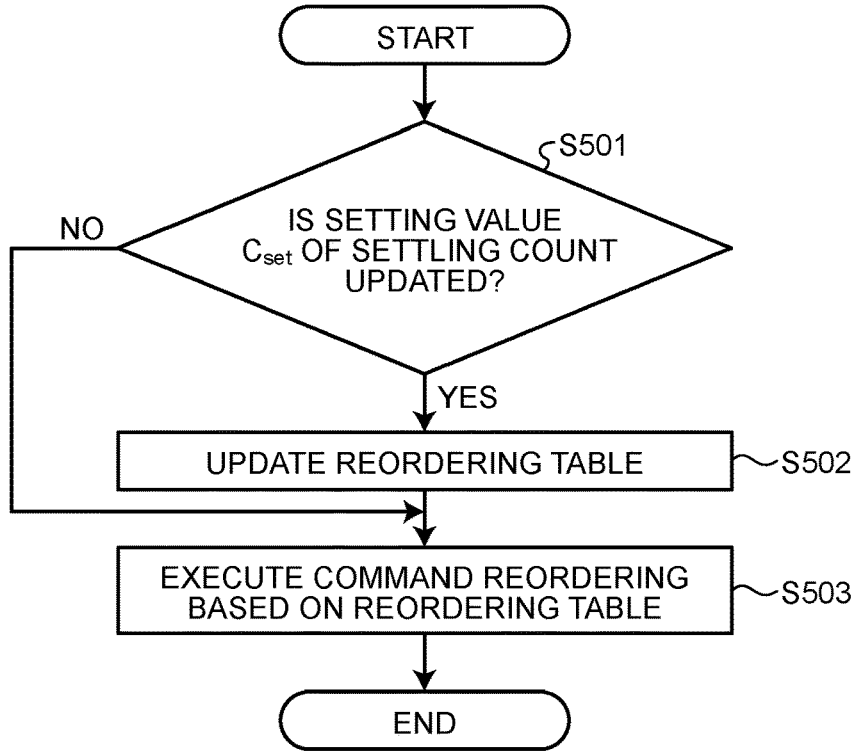
FIG. 11 is a flowchart illustrating an example of an operation of a magnetic disk apparatus 1 of a fourth embodiment.

FIG. 11 is a flowchart illustrating an example of the operation of the magnetic disk apparatus 1 of the fourth embodiment.

First, the controller 30 determines whether or not the setting value $C_{set}$ of the settling count is updated (S501).

In a case where Yes is determined in the determination processing of S501, the controller 30 updates the reordering table (S502). More specifically, the controller 30 calculates the estimated value of the seek time on the basis of the updated setting value $C_{set}$ of the settling count. Then, the controller 30 updates the old estimated value recorded in the reordering table with the new estimate value obtained by calculation.

In a case where No is determined in the determination processing of S501, the processing of S502 is skipped.

Then, the controller 30 executes the command reordering operation on the basis of the reordering table (S503), and a series of operations ends.

In this manner, the controller 30 executes the command reordering operation on the basis of the estimated value of the seek time. The controller 30 updates the estimated value of the seek time in accordance with the update of the setting value $C_{set}$ of the settling count.

Therefore, a decrease in the performance of the magnetic disk apparatus 1 due to a decrease in the efficiency of the command reordering operation is suppressed.

While some embodiments have been described, these embodiments have been presented by way of example only and are not intended to limit the scope of the inventions. Indeed, the novel embodiments described herein can be embodied in a variety of other forms; moreover, various omissions, substitutions and changes can be made without departing from the gist of the inventions. These embodiments or modifications thereof are included in the scope or the gist of the inventions and are included in the inventions described in the claims and an equivalent scope thereof.

What is claimed is:

1. A magnetic disk apparatus comprising:
a magnetic disk on which multiple tracks are provided;
a magnetic head; and
a controller configured to
move the magnetic head to a first track being one of the multiple tracks,
acquire, in a servo sampling cycle, a positioning error amount of the magnetic head with respect to the first track,
execute an access to the first track by using the magnetic head after a positioning error amount being equal to or less than a first threshold is continuously acquired a first set number of times,
obtain a frequency estimation value by estimating a frequency of residual vibration of the magnetic head due to movement of the magnetic head to the first track and obtain an amplitude estimation value by estimating an amplitude of the residual vibration, and
update the first set number of times on the basis of the frequency estimation value of the residual vibration and the amplitude estimation value of the residual vibration.

2. The magnetic disk apparatus according to claim 1, wherein, when the amplitude estimation value is larger than a second threshold, the controller updates the first set number of times with a value based on the frequency estimation value.

3. The magnetic disk apparatus according to claim 1, wherein the controller updates the first set number of times with a value obtained by dividing a servo sampling frequency by the frequency estimation value.

4. The magnetic disk apparatus according to claim 2, wherein, when the residual vibration of the magnetic head includes two or more vibrations whose amplitude estimation values are larger than the second threshold, the controller updates the first set number of times on the basis of the frequency estimation value of each of the two or more vibrations and a difference between the frequency estimation values of the two or more vibrations.

5. The magnetic disk apparatus according to claim 4, wherein the controller
multiplies, by a servo sampling frequency, a reciprocal of a minimum value among the frequency estimation value of each of the two or more vibrations and the difference between the frequency estimation values of the two or more vibrations, and
updates the first set number of times with a value obtained by the multiplication.

6. The magnetic disk apparatus according to claim 1, wherein the controller updates the first set number of times and updates the first threshold.

7. The magnetic disk apparatus according to claim 6, wherein the controller updates the first threshold on the basis of the frequency estimation value and the amplitude estimation value.

8. The magnetic disk apparatus according to claim 1, wherein
the access is a write operation, and
the controller
stops the write operation when a positioning error amount acquired while executing the write operation on the first track becomes larger than a third threshold, and
updates the first set number of times, and updates the third threshold on the basis of the frequency estimation value and the amplitude estimation value.

9. The magnetic disk apparatus according to claim 6, wherein the controller
acquires a first value by dividing a servo sampling frequency by the frequency estimation value,
updates the first set number of times with a second value smaller than the first value, and
decreases the first threshold in response to the update of the first set number of times.

10. The magnetic disk apparatus according to claim 1, wherein the controller
performs command reordering on the basis of an estimated value of a seek time, and
updates the estimated value in accordance with the update of the first set number of times.

11. A method comprising:
moving a magnetic head to a first track being one of multiple tracks provided on a magnetic disk;
acquiring, in a servo sampling cycle, a positioning error amount of the magnetic head with respect to the first track;
executing an access to the first track by using the magnetic head after a positioning error amount being less than or equal to a first threshold is continuously acquired a first set number of times;
obtaining a frequency estimation value by estimating a frequency of residual vibration of the magnetic head due to movement of the magnetic head to the first track and obtaining an amplitude estimation value by estimating an amplitude of the residual vibration; and
updating the first set number of times on the basis of the frequency estimation value of the residual vibration and the amplitude estimation value of the residual vibration.

12. The method according to claim 11, wherein the updating includes updating the first set number of times with a value based on the frequency estimation value as the amplitude estimation value becomes larger than a second threshold.

13. The method according to claim 11, wherein the updating includes updating the first set number of times with a value obtained by dividing a servo sampling frequency by the frequency estimation value.

14. The method according to claim 12, wherein the updating includes updating the first set number of times on the basis of the frequency estimation value of each of two or more vibrations whose amplitude estimation value included in the residual vibration of the magnetic head is larger than the second threshold and a difference between the frequency estimation values of the two or more vibrations.

15. The method according to claim 14, wherein the updating includes
multiplying, by a servo sampling frequency, a reciprocal of a minimum value among the frequency estimation value of each of the two or more vibrations and the difference between the frequency estimation values of the two or more vibrations, and
updating the first set number of times with a value obtained by the multiplying.

16. The method according to claim 11, further comprising updating the first set number of times and updating the first threshold.

17. The method according to claim 16, wherein the updating of the first threshold is performed on the basis of the frequency estimation value and the amplitude estimation value.

18. The method according to claim 11, wherein
the access is a write operation, and
the method further includes
stopping the write operation in response to a positioning error amount acquired while the write operation is executed for the first track becoming larger than a third threshold, and
updating the first set number of times, and updating the third threshold on the basis of the frequency estimation value and the amplitude estimation value.

19. The method according to claim 16, further comprising:
acquiring a first value by dividing a servo sampling frequency by the frequency estimation value;
updating the first set number of times with a second value smaller than the first value; and
decreasing the first threshold in response to the updating of the first set number of times.

20. The method according to claim 11, further comprising:
performing command reordering on the basis of an estimated value of a seek time; and
updating the estimated value in accordance with the updating of the first set number of times.

* * * * *